(12) United States Patent
Young et al.

(10) Patent No.: US 12,287,756 B2
(45) Date of Patent: Apr. 29, 2025

(54) GENERAL-PURPOSE SYSTOLIC ARRAY

(71) Applicant: Google LLC, Mountain View, CA (US)

(72) Inventors: Reginald Clifford Young, Palo Alto, CA (US); Trevor Gale, Boston, MA (US); Sushma Honnavara-Prasad, Los Gatos, CA (US); Paolo Mantovani, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/376,494

(22) Filed: Oct. 4, 2023

(65) Prior Publication Data

US 2024/0078212 A1 Mar. 7, 2024

Related U.S. Application Data

(63) Continuation of application No. 17/703,479, filed on Mar. 24, 2022, now Pat. No. 11,829,321.

(51) Int. Cl.
*G06F 15/80* (2006.01)

(52) U.S. Cl.
CPC ...... *G06F 15/8046* (2013.01); *G06F 15/8069* (2013.01); *G06F 15/8084* (2013.01)

(58) Field of Classification Search
None
See application file for complete search history.

(56) References Cited

U.S. PATENT DOCUMENTS

| | | | |
|---|---|---|---|
| 9,158,575 B2 * | 10/2015 | Smith | G06F 15/82 |
| 9,170,812 B2 | 10/2015 | Vorbach et al. | |
| 10,528,321 B2 | 1/2020 | Bittner et al. | |
| 10,698,976 B2 | 6/2020 | Phelps et al. | |
| 10,824,938 B2 | 11/2020 | Barik et al. | |
| 11,494,627 B1 | 11/2022 | Li et al. | |
| 2013/0311532 A1 | 11/2013 | Olsen | |
| 2014/0337853 A1 * | 11/2014 | Kim | G06F 9/5094 718/104 |
| 2015/0268963 A1 * | 9/2015 | Etsion | G06F 9/3869 712/225 |
| 2018/0307495 A1 * | 10/2018 | Ould-Ahmed-Vall | G06F 9/3851 |
| 2020/0279169 A1 | 9/2020 | Hoskins et al. | |
| 2020/0341942 A1 * | 10/2020 | Ray | G06F 15/8007 |

(Continued)

OTHER PUBLICATIONS

Annaratone et al. The Warp Computer: Architecture, Implementation, and Performance. IEEE Transactions on Computers, IEEE, USA, vol. C-19, No. 12, Dec. 31, 1987 (Dec. 31, 1987), pp. 1523-1538.

(Continued)

*Primary Examiner* — Eric Coleman
(74) *Attorney, Agent, or Firm* — Botos Churchill IP Law LLP

(57) ABSTRACT

A systolic array cell is described, the cell including two general-purpose arithmetic logic units (ALUs) and register-file. A plurality of the cells may be configured in a matrix or array, such that the output of the first ALU in a first cell is provided to a second cell to the right of the first cell, and the output of the second ALU in the first cell is provided to a third cell below the first cell. The two ALUs in each cell of the array allow for processing of a different instruction in each cycle.

20 Claims, 15 Drawing Sheets

(56) References Cited

U.S. PATENT DOCUMENTS

2021/0201466 A1\*   7/2021   Chen .................. G06V 10/993
2021/0406010 A1   12/2021   Ahmed

OTHER PUBLICATIONS

Annaratore, E. et al., Warp Architecture and Implementation, 1986, IEEE, pp. 346-356. (Year: 1986).

Borkar et al. iWarp: An Integrated Solution to High-Speed Parallel Computing. Supercomputing '88. Yvol. I, Proceedings. Orlando, FL, USA Nov. 14-18, 1988, Washington, DC, USA, IEEE Comput. Soc. Pr, US, Nov. 14, 1988 (Nov. 14, 1988), pp. 330-339.

Fisher et al. Architecture of the PSC: A Programmable Systolic Chip. Proceedings of the Annual Symposium on Computer Architecture. Stockholm, 1983; [Proceedings of the Annual International Symposium on Computer Architecture], Los Angeles, IEEE Comp. Soc. Press, US, vol. SYMP. 10, Jun. 13, 1983 (Jun. 13, 1983), 6 pages.

International Search Report and Written Opinion for International Application No. PCT/US2023/013016 dated May 26, 2023. 18 pages.

Lee et al. Super Semi-systolic Array-Based Application-Specific PLO Architecture. Mar. 31, 2006 (Mar. 31, 2006), SAT 2015 18th International Conference, Austin, TX, USA, Sep. 24-27, 2015; [Lecture Notes in Computer Science; Lect.Notes Computer], Springer, Berlin, Heidelberg, 6 pages.

Xu, J. et al., Accelerating Matrix Processing for MIMO Systems, 2021, IEEE, 6 pages. (Year: 2021).

\* cited by examiner

GENERAL-PURPOSE SYSTOLIC ARRAY

CROSS-REFERENCE TO RELATED APPLICATIONS

The present application is a continuation of U.S. patent application Ser. No. 17/703,479, filed Mar. 24, 2022, the disclosure of which is hereby incorporated herein by reference.

BACKGROUND

A general parallel computing problem asks how to build a general computer with multiple parallel operating elements, which can be used effectively on a single computing problem. Existing solutions include systolic arrays that are fixed-function, wherein a matrix multiplication unit (MXU) of a tensor processing unit (TPU) and tensor cores of a graphics processing unit (GPU) perform matrix multiplications. Early systolic arrays had very small node count, such as 8 nodes. GPUs can only reach their peak on matrix multiplications. Many-core central processing units (CPUs) only reach tens or sometimes hundreds of parallel cores. Vector machines have compute units that are one-dimensional.

BRIEF SUMMARY

The present disclosure provides a computation unit capable of operations beyond dense linear algebra. Such operations may include sparse linear algebra, sorting, compression, dynamic programming, and a variety of permutation and table-lookup tasks. The computation unit includes a systolic array of cells that each include a crossbar switch, one or more general purpose arithmetic logic units (ALUs), and a register file that receives output from the one or more general purpose ALUs and provides it back to the crossbar switch. Cells are linked by buses, which carry right outputs from one cell to the left input of the next cell over, or they carry bottom outputs from one cell to the top input of the next cell down.

The systolic array may be programmed to execute loop-blocks, each loop-block being a sequence of instructions that is executed one time each in all of the cells of the systolic array. The loop block starts in the upper-left (0,0) origin of the array and propagates along antidiagonals through the array, although the only hardware ordering constraint is that the top and left predecessor must have executed before the current cell. Different loop blocks change the behavior of the systolic array. Running different loop blocks allows for performing dense or sparse matrix multiplication, sorting of integers, records, and strings, compression, and dynamic programming algorithms to map to the systolic array. At the edges of the array, data is fed in as vectors along the top and left sides, propagates through the array, and is modified by the loop block programs, then produces output vectors on the bottom and right. These input and output vectors may be served by a standard vector or SIMD load/store engine.

One aspect of the disclosure provides a systolic cell, comprising a crossbar switch, a first arithmetic logic unit (ALU) coupled to a first output of the crossbar switch, a second ALU coupled to a second output of the crossbar switch; and a register file configured to receive, as input to the register file, output from the first ALU and the second ALU. An output of the register file may be provided to an input of the crossbar switch. The crossbar switch may be configured to receive, as input to the crossbar switch, output from one or more adjacent systolic cells. According to some examples, at least one of the first or second ALUs may comprise a multiplier.

The register file may use a relatively small register, such as a 64-bit register or smaller. According to some examples, the crossbar switch is a 4×4 crossbar switch, configured to receive two inputs from the register file and two inputs from adjacent cells, and to provide two outputs to the first ALU and two outputs to the second ALU.

In other examples, the systolic cell further comprises a third arithmetic logic unit coupled between the crossbar switch and the register file.

Another aspect of the disclosure provides a systolic array, comprising a plurality of cells arranged such that a first output of a first cell is provided as input to a second adjacent cell, and a second output of the first cell is provided as input to a third adjacent cell. Each of the cells in the array may include a crossbar switch, one or more ALUs coupled to output of the crossbar switch, a register file configured to receive, as input to the register file, output from the first ALU and the second ALU. The one or more ALUs may be general ALUs. According to some examples, an output of the register file in each cell is provided to an input of the crossbar switch in the same cell.

The one or more ALUs may include a first ALU coupled to a first output of the crossbar switch and a second ALU coupled to a second output of the crossbar switch. In some examples, a crossbar switch of a fourth cell is configured to receive, as input to the crossbar switch, output from the first ALU of the third cell and output from the second ALU of the second cell.

According to some examples, the array is configured to receive two source vectors and produce at least one result vector per cycle.

Another aspect of the disclosure provides a computing system, comprising one or more memories, one or more processors in communication with the one or more memories, and a plurality of cells in communication with the one or more processors, the plurality of cells arranged such that a first output of a first cell is provided as input to a second adjacent cell, and a second output of the first cell is provided as input to a third adjacent cell. Each cell may comprise a crossbar switch, a first arithmetic logic unit (ALU) coupled to a first output of the crossbar switch, a second ALU coupled to a second output of the crossbar switch, and a register file configured to receive, as input to the register file, output from the first ALU and the second ALU.

The one or more processors may comprise at least one of a scalar core and a vector processing unit. The one or more memories may comprise a vector data cache.

According to some examples, the system further includes a sequencer configured to control instructions sent to the one or more processors and the plurality of cells.

The array may be configured to receive two source vectors and produce at least one result vector per cycle.

DETAILED DESCRIPTION

According to the present disclosure, a systolic array cell includes one or more general-purpose arithmetic logic units (ALUs) and a register file. Each of the one or more ALUs may receive input from output ports of a crossbar switch. Outputs of the ALUs may be input to the register file, which is then input back into the crossbar switch. Outputs from the ALUs may further be input to adjacent cells. For example, an output from the first ALU may be input to the crossbar switch of a second cell to the right in an array. An output from the second ALU may be input to the crossbar switch of a third cell below in the array. Buses may be generalized such that there are one-or-more horizontal and one-or-more vertical buses, controlled by a programmer Buses may be unidirectional, such that only down and right connections are included. This may avoid arbitration.

Instructions may be delivered systolically, so the array behaves in a single instruction/multiple data (SIMD) manner. For example, the instruction flow can be performed using a spanning tree of cells, such that predecessor cells to a left or top of a current cell has the previous instruction. A single control unit at a top-left-corner of the array can deliver an instruction to the upper-left-corner of the array. Then instructions propagate along antidiagonal wavefronts through the array. In other words, for a given cell in the array, the cell can receive input from upstream adjacent neighbors, and pass output along to downstream adjacent neighbors, where the terms upstream and downstream are relative to the direction instructions or data is propagated through the array. Each instruction visits all cells of the rectangular systolic array once. This delivery provides SIMD-style control, with one control unit for all cells, but with pipelined delivery. According to some examples, the array may be a one-dimensional vector unit using pipelined instruction control.

The array may be configured to perform different tasks by changing the program run in a cell. The array can operate as a dense or sparse matrix multiplier, or as a sorting network, or as a compressor, or as a stage of a dynamic programming calculation.

The parallel computing approach described herein has no contention or arbitration between concurrently operating cells, by design. Like a systolic array matrix multiplier or very long instruction word (VLIW), program execution time is entirely determinable by analyzing the source code, not dependent on the data.

Figure 1:
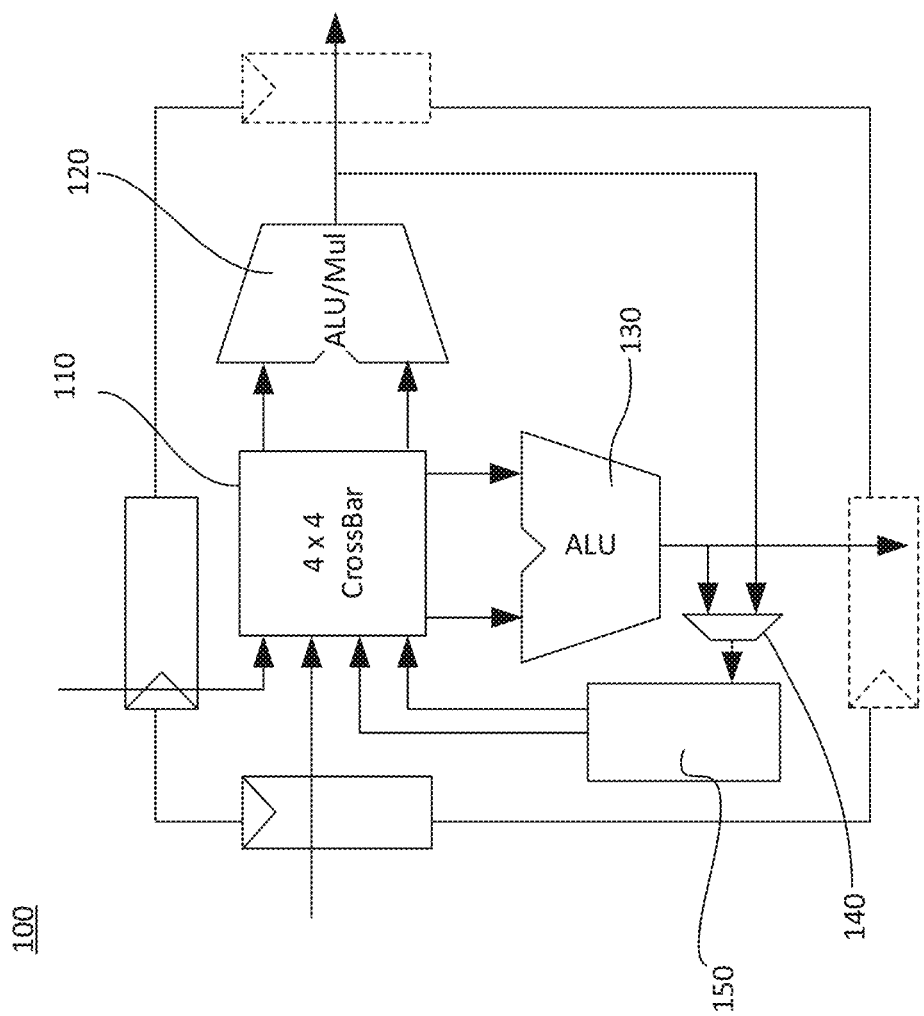
FIG. 1 is a circuit diagram illustrating an example cell according to aspects of the disclosure.
Figure 2:
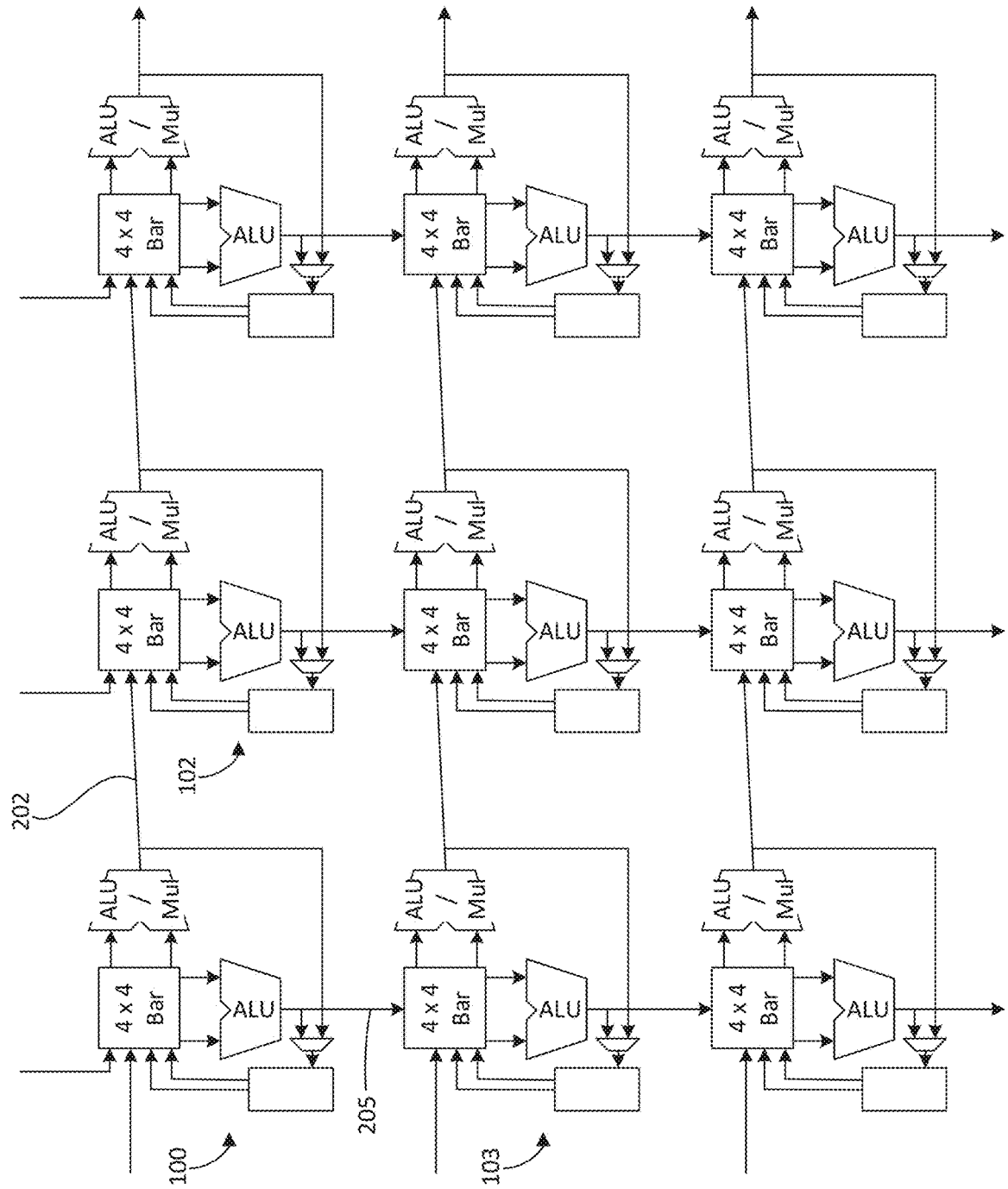
FIG. 2 illustrates an example array of the cells of FIG. 1.

FIG. 1 illustrates an example cell 100 that may be used in a computation unit 200 as shown in FIG. 2. The cell 100 may be a flexible arithmetic-logical systolic two-dimensional unit. The cell 100 may have a similar architecture to a matrix multiplication unit (MXU). However, rather than fixed-function multiply-accumulate hardware, the cell 100 includes one or more arithmetic logic units (ALUs) 120, 130. According to some examples, floating point ALUs may be used. Moreover, SIMD-within-register ALUs may be used, doing four 8-bit operations inside of a 32-bit register file. While two ALUs are illustrated and described in this example, in other examples additional or fewer ALUs can be implemented.

The ALUs 120, 130 may be, for example, general purpose ALUs or specialized ALUs. The ALUs 120, 130 may be 16-bit, 32-bit, 64-bit, or any other value. While in some examples both ALUs 120, 130 are a same type and size, in other examples the ALUs 120, 130 may differ from one another. According to some examples, ALU 120 may be equipped with a multiplier, such as a 16b, 32b, or other multiplier. The size of the multiplier may vary in relation to the size of the ALUs. According to other examples, the ALU may be capable of other types of specialized operations, such as population count and find-first-set/find-first-zero/count-leading-sign bit operations.

While two ALUs 120, 130 are illustrated in FIG. 1, in other examples additional or fewer ALUs may be included. The ALUs in a call can all be driven by the same VLIW instruction bundle, such that the cell executes the bundle in a single cycle. The instruction bundle may include as many operations as there are ALUs in the cell.

Each of the two ALUs 120, 130 may be coupled to an output of a crossbar switch 110. As shown in the example of FIG. 1, the crossbar switch 110 is a 4×4 crossbar switch. In other examples, other types of crossbar switches may be used. Inputs to the crossbar switch 110 may include outputs from adjacent cells, such as cells to a left or cells above in an array. Inputs to the crossbar switch 110 may further include one or more outputs from a general purpose register file 150, described further below.

Outputs of the two ALUs 120, 130 may be input to a multiplexer 140 which may be further input to the register file 150. According to some examples, the multiplexer 140 may select one of the ALU outputs for writing to the register file. For example, the multiplexer 140 may select an output based on instructions being passed. For example, given a bundle where a first ALU writes to its corresponding bus, and a second ALU writes to the register file, the multiplexer may select the second ALU. In examples where the register file includes additional ports, both ALU outputs may be written to the register file per cycle. In such examples, the multiplexer 140 may be omitted.

The register file 150 may be relatively small, such as having 8 entries or the like. Rather than a dedicated register, as used in MXU cells, the register file 150 in the cell 100 may be a general purpose register. According to some examples, the cells do not include a large local storage. According to other examples, an addressable memory may be included.

Each of the two ALUs 120, 130 may be controlled with a true instruction stream. In this regard, each cell 100 in an array can execute instructions at different instruction cycles. The control unit also propagates instructions along antidiagonal wavefronts in the rectangular array, so each instruction visits every cell in the array once.

FIG. 2 illustrates an example computation unit 200, including an array of cells 100 having an architecture as described above in connection with FIG. 1. In this example, the computation unit 200 is a rectangular, two-dimensional systolic array. Wires 202, 205 forming connections between cells of the array flow top-to-bottom and left-to-right. For example, wire 202 may couple an output of the cell 100 to an input of cell 102 to the right of the cell 100, and wire 205 may couple an output of the cell 100 to an input of cell 103 below the cell 100. Each cell in the array receives inputs from the top and left, performs computations, and sends outputs down and right. Data propagates through the rectangular array along anti-diagonal wavefronts. Orthogonal wires of the systolic array 200 may match metal layers of modern semiconductor processes. Although examples are provided herein for connections between the cells according to a particular direction and orientation, e.g., top-to-bottom, and left-to-right, it is understood that other arrangements are possible, e.g., bottom-to-top, and right-to-left.

The array 200 may have various dimensions. For example, the array 200 may be a square, with an equal number of cells in each dimension, e.g., horizontally and vertically. Such square array may have a dimension of, for example, 16, 32, 64, or any other number. According to other examples, the array 200 may be rectangular, with a different number of cells in each dimension. The dimensions of the array 200 may relate to a vector length of base core. In this regard, vector load and store operations on the base core may be matched up with push/pop operations in each cell.

The array 200 may fit in a tiny corner of a chip. Moreover, it draws little power, while still being effective at performing computations.

While the array 200 may be a rectangular systolic array, software may be implemented to emulate other topologies. Other example topologies include, for example, a multi-dimensional torus, a mesh, a hypercube, a butterfly, a fat tree, or a ring. For example, the array 200 can perform a variety of functions, including but not limited to: permutations and multiport table lookups; sort integers, strings, and records; compress using a Burrows-Wheeler Transform; align genetic sequences using dynamic programming with the Smith-Waterman algorithm, etc.

The cell 100 may execute a different instruction every cycle. A sequencer may control the instructions sent to each cell 100. Each cell 100 includes one or more general purpose ALUs, each of which can perform a standard set of operations. For example, each cell 100 may include, one, two, four, six, or more general purpose ALUs. Each cell 100 is fed by an instruction stream directing what to do every cycle. In an example where the cell includes 2 ALUs, each cell 100 can perform twice the work per cycle of a system with one ALU per cell. A systolic wavefront propagates on an anti-diagonal pipeline through the array 200 as such work is performed by the cells 100 per cycle. For example, instructions may be delivered systolically, so the array behaves in a SIMD manner Instructions propagate along antidiagonal wavefronts, for example, from a left side of the array to the right side. Each instruction takes B cycles to progress through the array, where B=2*(dimension of the array)−1. Each instruction uses a different set of ALUs every single cycle.

According to some examples, flip-flops may be used to enforce cycle boundaries. For example, the flip-flop in a given cell may hold a value that is used for the adjacent cell. The flip-flop may be located at every cell boundary. Within a single cycle, all register read execution and register writebacks happen with one register cycle. But more sophisticated systems could use pipelining and bypass networks to reduce the clock cycle time and improve the clock rate. Inter-cell registers, which are not implemented as part of the register file, also need to be on the same clock.

Collective operation of the entire array 200 of cells defines the behavior of the cell. As an example, a sorting kernel looks like:

$$b=\min(t,l);\ r=\max(t,l)$$

where in a single cycle, the two-operation bundle specifies that the one ALU writes the bottom (b) output with the minimum of the top (t) and left (l) inputs. At the same time the other ALU writes the right (r) output with the maximum of the top and left inputs. An individual cell performs the "compare-and-swap" operation of a sorting network. But when grouped into an entire $N^2$-cell systolic array of compare-and-swap operations, the unit permutes any input vector into sorted order, effectively implementing a quadratic bubble-sorting network.

Figure 3:
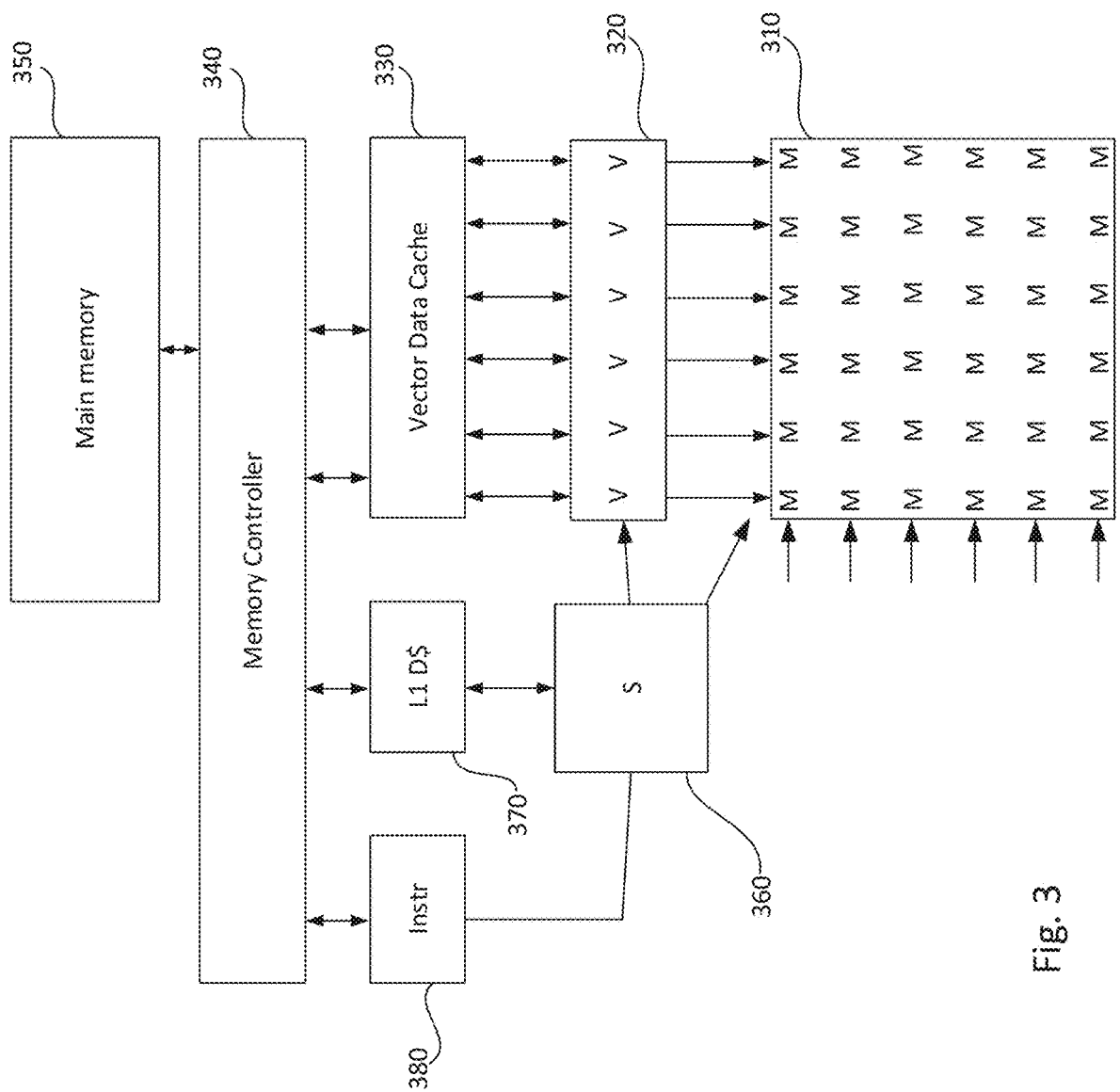
FIG. 3 illustrates an example hardware implementation according to aspects of the disclosure.

FIG. 3 illustrates an example hardware implementation. As shown, the implementation includes a matrix unit 310, with injection from its left and top. The matrix unit 310 may receive input from vector unit 320. For example, as shown, data from the vector unit 320 are input to a top and left hand side of the matrix unit 310. Scalar core 360 supplies input to the matrix unit 310 and the vector unit 320. The vector unit 320 communicates with vector data cache 330, which communicates with memory controller 340. Scalar core 360 receives instructions from instruction cache 380 coupled to memory controller 340, and also an L1 cache 370. The L1 cache 370 may be backed by one or more other cache levels. The memory controller 340 may communicate with a main memory 350 of a computing system. In some implementations, the vector data cache 330 is a L2 data cache, and L1 data cache 370 misses are served from it. In some implementations, coherence is enforced by hardware including the memory controller among all the caches.

Though not shown in FIG. 3, output from the matrix unit 310 may feed back into vector unit 320. For example, outputs may be generated from a bottom and right hand side of the matrix unit 310. Such output may be looped back as input into the vector unit 320. In this regard, full cycle connectivity may be obtained. For example, a subsequent computation can be used to process data from a previous wave.

The scalar core 360 and vector unit 320 may be part of a base core, built according to an instruction set architecture (ISA). The scalar core 360 executes branches and generates addresses. The vector unit 320 moves data between a memory system and each cell of the matrix unit 310. The memory system may include, for example, one or more of the main memory 350, memory controller 340, and/or vector data cache 330. The base core may include a vector coprocessor expansion port for connection to the matrix unit 310. From the perspective of the base vector unit 320, each cell of the matrix 310 may appear as a coprocessor or extension vector ALU, to which two source vectors are sent and one result vector per cycle is received in return.

The matrix unit 310 may be, for example, an array of cells, such as the array 200 of FIG. 2 made up of cells 100 of FIG. 1. Based on such architecture, the matrix unit 310 may perform sorting operations, semiring operations such as compare, max-reduce, etc.

The vector unit 320 may be a processor or computation unit that can operate on an entire vector in one instruction.

The vector unit 320 may include, for example, a RISC-V instruction set architecture (ISA) or other types of architecture. The vector unit 320 may include vectors of data, indices, block addresses, or other information.

The vector data cache 330 may be a cache or other type of memory or storage unit that holds vector data accessed by the vector unit 320.

The scalar core 360 may be a processor that performs computations on one number or set of data at a time. The scalar core 360 may include, for example, RISC-V ISA extensions. The scalar core 360 may execute branches and generate addresses. A sequencer may control an order in which instructions are executed by the scalar core 360, the vector unit 320, and the matrix unit 310. In some implementations, scalar, vector, and matrix instructions all occur in a single instruction stream.

Figure 4:
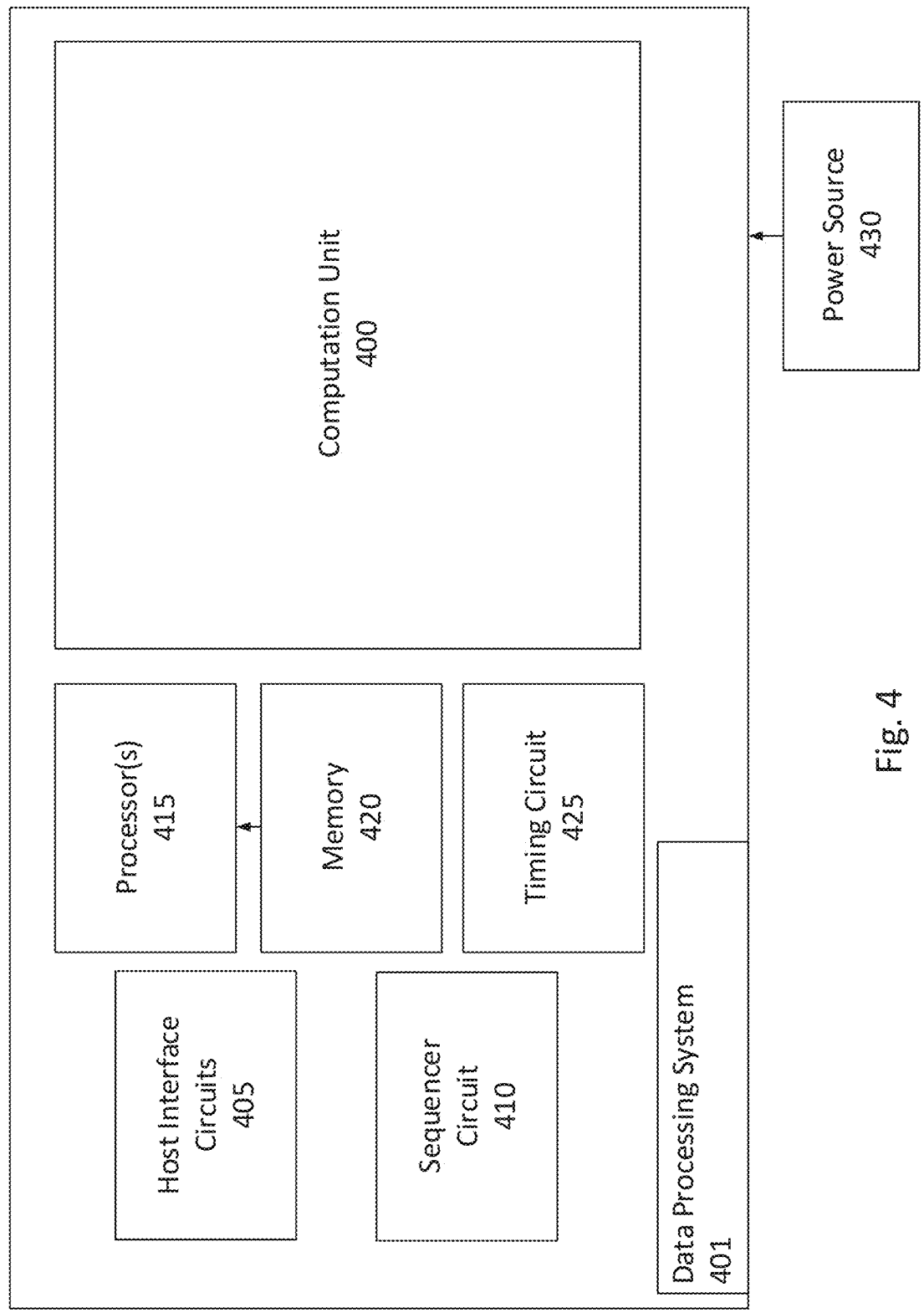
FIG. 4 illustrates an example system according to aspects of the disclosure.

FIG. 4 is a block diagram of a data processing system 401 implementing an example computation unit 400. The computation unit 400 can be any of a variety of different computation units, for example the array 200 of cells 100 described herein with reference to FIGS. 1-3. The computation unit 400 can implement any of a variety of combinations of the horizontal and vertical circuits as described throughout this specification.

The data processing system can include a host interface 405, a sequencer circuit 410, one or more processor(s) 415, memory 420, and a timing circuit 425. The data processing system 401 can be implemented in one or more devices across one or more physical locations, as described herein with reference to FIG. 5. In some examples, the components of the data processing system 401 described can be implemented on one or more chips, which can interface with a host device according to any of a variety of data bus or other physical interconnect interfaces. In some examples, the data processing system 401 can be implemented on one or more devices on a network, e.g., on one or more servers of a cloud platform.

Figure 5:
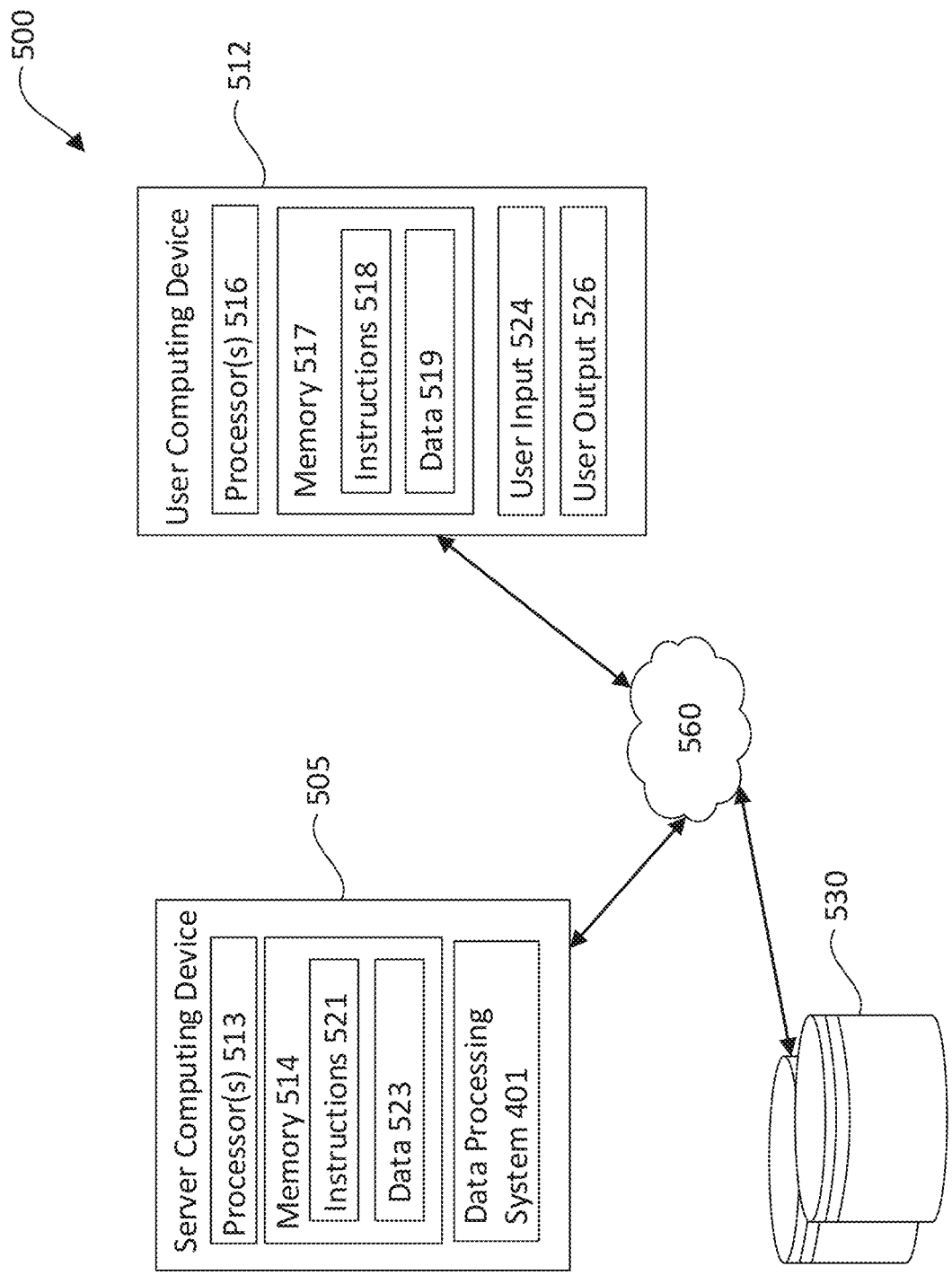
FIG. 5 illustrates an example computing environment according to aspects of the disclosure.

The processor(s) 415 and memory 420 can be any of a variety of different types of processors and memory as described herein with reference to FIG. 5. In some examples, the processor(s) 415 receive instructions that are executable by the computation unit 400 for processing data. For example, the instructions can be part of a computer program written for performing operations using the computation unit 400.

The sequencer circuit 410 can convert the received instructions into one or more signals understood by the computation unit 400, which causes the computation unit 400 to perform any of a variety of preconfigured operations. These operations can include loading data, e.g., from the memory 420, into the systolic array of the computation unit 400, moving data into one or more of the processing elements of the systolic array, processing the data by the one or more processing elements, and pushing the data out of the systolic array. The sequencer circuit 410 can also be configured to generate one or more control signals for controlling when instructions are pushed to the computation unit 400.

The host interface 405 can be configured to receive data from outside the data processing system 401, e.g., from a processor or another device, and send data generated by the computation unit 400, e.g., the product of a matrix multiplication, to the one or more devices or processors.

The timing circuit 425 can be configured to control the timing of the computation unit, e.g., its clock frequency or clock rate. For example, operations performed by the computation unit 400 may be performed once per clock cycle, with such clock cycles managed by the timing circuit 425.

The data processing system 401 can also be connected to a power source 1030. The power source 430 can be a battery or other form of power available on a host device implementing the data processing system, or can be a source external to the host device and connected to the host device and the data processing system 401 through some wireless or physical connection, e.g., through wires. The power source 430 can supply voltage to the computation unit 400, which can be managed, e.g., adjusted higher or lower, by the processor(s) 415.

FIG. 5 is a block diagram of an example environment 500 for implementing the data processing system 401 including the computation unit 400. The system 501 can be implemented on one or more devices having one or more processors in one or more locations, such as in server computing device 505. User computing device 512 and the server computing device 505 can be communicatively coupled to one or more storage devices 530 over a network 560. The storage device(s) 530 can be a combination of volatile and non-volatile memory, and can be at the same or different physical locations than the computing devices 512, 505. For example, the storage device(s) 530 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 505 can include one or more processors 513 and memory 514. The memory 514 can store information accessible by the processor(s) 513, including instructions 521 that can be executed by the processor(s) 513. The memory 514 can also include data 523 that can be retrieved, manipulated or stored by the processor(s) 513. The memory 514 can be a type of non-transitory computer readable medium capable of storing information accessible by the processor(s) 513, such as volatile and non-volatile memory. The processor(s) 513 can include one or more central processing units (CPUs), graphic processing units (GPUs), field-programmable gate arrays (FPGAs), and/or application-specific integrated circuits (ASICs), such as tensor processing units (TPUs).

The instructions 521 can include one or more instructions that when executed by the processor(s) 513, causes the one or more processors to perform actions defined by the instructions. The instructions 521 can be stored in object code format for direct processing by the processor(s) 513, or in other formats including interpretable scripts or collections of independent source code modules that are interpreted on demand or compiled in advance. The instructions 521 can include instructions for implementing the system 401 consistent with aspects of this disclosure. The system 401 can be executed using the processor(s) 513, and/or using other processors remotely located from the server computing device 505.

The data 523 can be retrieved, stored, or modified by the processor(s) 513 in accordance with the instructions 521. The data 523 can be stored in computer registers, in a relational or non-relational database as a table having a plurality of different fields and records, or as JSON, YAML, proto, or XML documents. The data 523 can also be formatted in a computer-readable format such as, but not limited to, binary values, ASCII or Unicode. Moreover, the data 523 can include information sufficient to identify relevant information, such as numbers, descriptive text, proprietary codes, pointers, references to data stored in other memories, including other network locations, or information that is used by a function to calculate relevant data.

The user computing device 512 can also be configured similar to the server computing device 1105, with one or more processors 516, memory 517, instructions 518, and data 519. The user computing device 512 can also include a user output 526, and a user input 524. The user input 524 can include any appropriate mechanism or technique for receiving input from a user, such as keyboard, mouse, mechanical actuators, soft actuators, touchscreens, microphones, and sensors.

The server computing device 505 can be configured to transmit data to the user computing device 512, and the user computing device 512 can be configured to display at least a portion of the received data on a display implemented as part of the user output 526. The user output 526 can also be used for displaying an interface between the user computing device 512 and the server computing device 505. The user output 526 can alternatively or additionally include one or more speakers, transducers or other audio outputs, a haptic interface or other tactile feedback that provides non-visual and non-audible information to the platform user of the user computing device 512.

Although FIG. 5 illustrates the processors 513 and the memories 514 as being within the computing device 505, components described in this specification, including the processors 513 and the memories 514, can include multiple processors and memories that can operate in different physical locations and not within the same computing device. For example, the processors 513 can include a collection of processors that can perform concurrent and/or sequential operation.

The server computing device 505 can be configured to receive requests to process data from the user computing device 512. For example, the environment 500 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 512 may receive and transmit data specifying operations to be performed by the computation unit 400.

The devices 512, 505 can be capable of direct and indirect communication over the network 560. The devices 505, 512 can set up listening sockets that may accept an initiating connection for sending and receiving information. The network 560 itself can include various configurations and protocols including the Internet, World Wide Web, intranets, virtual private networks, wide area networks, local networks, and private networks using communication protocols proprietary to one or more companies. The network 560 can support a variety of short- and long-range connections. The short- and long-range connections may be made over different bandwidths, such as 2.402 GHz to 2.480 GHz (commonly associated with the Bluetooth® standard), 2.4 GHz and 11 GHz (commonly associated with the Wi-Fi® communication protocol); or with a variety of communication standards, such as the LTE® standard for wireless broadband communication. The network 1160, in addition or alternatively, can also support wired connections between the devices 1112, 1105, including over various types of Ethernet connection.

Although a single server computing device 505, user computing device 512, data processing system 4001 are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof. In some examples, one or more devices implement one or more data processing systems, each data processing system including one or more computation units according to aspects of the disclosure. In some examples, a single device can implement multiple computation units, each of the multiple computation units configured to communicate with at least one other computation unit for performing a distributed data processing task, e.g., in sequential or parallel processing.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The systolic array described above may be programmed to execute loop-blocks, each loop-block being a sequence of instructions that is executed one time each in all of the cells of the systolic array. The loop block starts in the upper-left (0,0) origin of the array and propagates along antidiagonals through the array, although the only hardware ordering constraint is that the top and left predecessor must have executed before the current cell. Different loop blocks change the behavior of the systolic array. Running different loop blocks allows for performing dense or sparse matrix multiplication, sorting of integers, records, and strings, compression, and dynamic programming algorithms to map to the systolic array. At the edges of the array, data is fed in as vectors along the top and left sides, propagates through the array, and is modified by the loop block programs, then produces output vectors on the bottom and right. These input and output vectors may be served by a standard vector or SIMD load/store engine.

Software pipelining may be performed at each cell 100 and at the array 200. A software-pipelined loop typically has three parts, the prologue, body, and epilogue. The body is the steady-state software pipelined program, which exhibits best-case throughput in terms of loops launched per cycle. The prologue has the job of "spinning up" the software pipeline, getting enough work running on an inductive logic programming (ILP) machine to reach the steady state in the body. The epilogue is similar in reverse, "spinning down" the machine when there are no more iterations. The height of the body in cycles is called the Initiation Interval (II). Software pipelining searches for a minimum II (MinII) that can be achieved for a loop. Resources, including registers, can limit II. This resource limit is called the Resource II (ResII).

Within the array 200, cell fragments or loop blocks are written within each cell 100. Each cell fragment may start with a vector push into the array, have a per-cell instruction that propagates along antidiagonal wavefronts through the array, and finish by returning results through a vector pop, around 2N cycles after the first vector push. Each cell fragment is a sort of 2D hardware-supported loop that executes in a handful of array cycles, described further below in connection with FIGS. 7A-E.

Figure 6C:
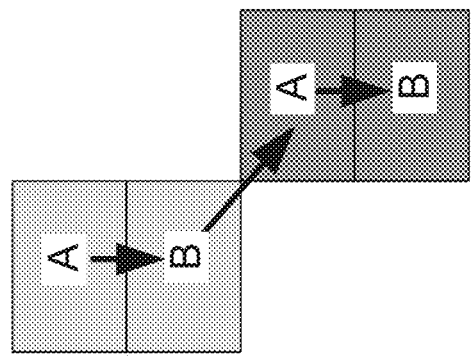
FIG. 6A-6C illustrate an example of a multi-cycle fragment propagating from cell to cell over time, according to aspects of the disclosure.
Figure 6B:
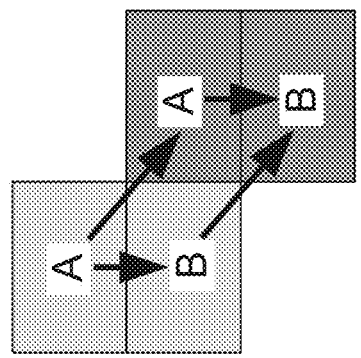
Figure 6A:
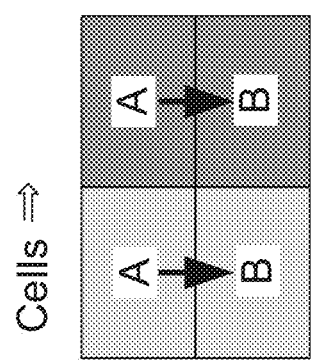

FIGS. 6A-C illustrate an example of a multi-cycle fragment, specifically a two-cycle fragment, and how it propagates from cell to cell over time in the array.

FIG. 6A illustrates an instance where there are no inter-cell dependencies. The only dependencies, indicated by arrows, are from one instance of instruction A to the following instance of instruction B. Such dependencies tend to run through the register file, where A writes to a register and B reads that register value. Because these dependencies do not get transmitted across a cell boundary, they are referred to as temporal dependencies. This case corresponds to a stagger of 0, but it requires that the data have already been present in each cell.

FIG. 6B illustrates an instance that includes inter-cell dependencies, but only from an instance of an instruction to an instance of the same instruction in the next cell. An instruction may be, for example, a VLIW bundle consisting of one or more RISC-style operations. Because the inter-cell dependencies are carried through the wires and flip-flops between cells, the right instance of each instruction gets its input one cycle later than the left instance. In this case, it's correct for the cell fragments to be offset by one cycle in time, corresponding to a stagger of 1. The temporal dependency from A to B does not affect the stagger. Even if operation A took many cycles of latency to complete, the spatial dependencies from A to A and from B to B can proceed at a stagger of 1. Any processing from left-to-right or top-to-bottom completes in a single cycle.

FIG. 6C illustrates an instance where the inter-cell dependency goes from instruction B to instruction A. This case runs slower, because the left instance of instruction B finishes its work before it passes its output to the right instance of instruction A. This case corresponds to a stagger of 2. Instead of 2N−1 cycles to execute a single instruction, this example will spend 4N−2 cycles executing this pair of instructions.

When the cell fragment uses the buses, the buses preserve conservation of flow, such that a cell fragment has as many writes to a bus as there are reads from that bus, and the program relies on in-order delivery of those values on the bus. Each write of a value happens at the same or later cycle in the cell fragment as the original read of that value. If the read and write happen in the same cycle, that dependency induces a stagger of 1. If the write happens d cycles after the read, that dependency induces a stagger of d+1. The whole program's stagger is the maximum over all such bus write/read pairs. To support the control stagger, a short instruction FIFO is included between cells. By way of example, the FIFO may be approximately 8 instructions or fewer.

FIGS. 7A-E illustrate example array cycle diagrams for the array 200 of FIG. 2. An array cycle may be defined algebraically as a set of space-time triples (i, j, i+j); i∈[0,N), j∈[0,N) forming a wavefront that sweeps out a sequence of antidiagonals sequentially in time. Each array cycle visits N2 cells so it can do N2 work, and it takes a latency of 2N−1 cycles to complete. Such array cycles pipeline, such that one array cycle can be launched from the upper-left corner cell of the array every cycle. After 2N cycles the sequence fully utilizes the array. A sequence of M sequential array cycles will take M+2N−2 cycles to complete.

Figure 7B:
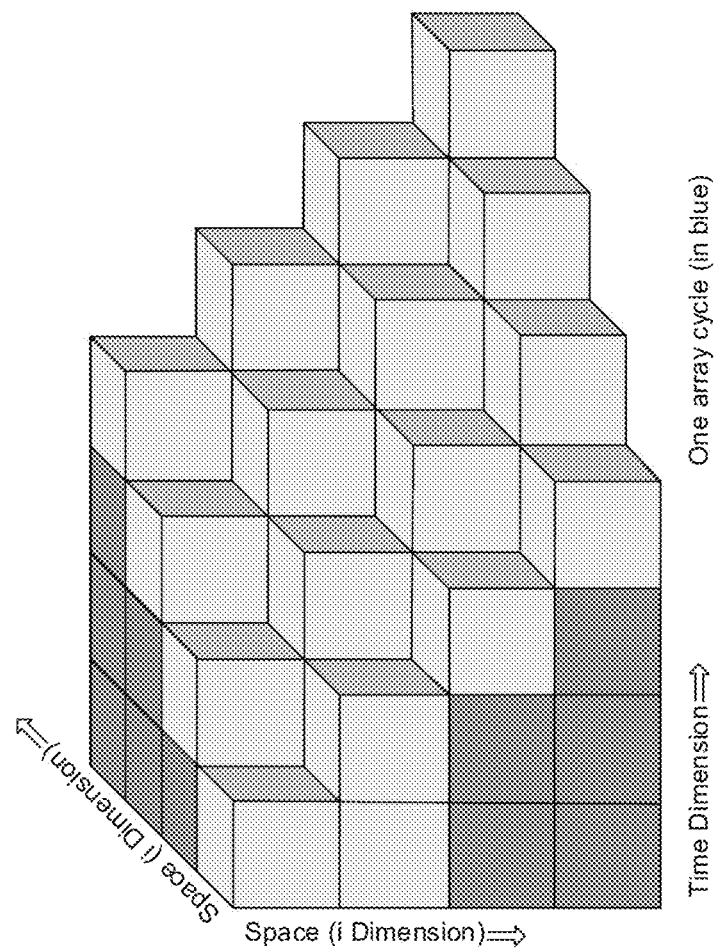
FIGS. 7A-7E illustrate example execution of operations with varying degrees of stagger according to aspects of the disclosure.
Figure 7A:
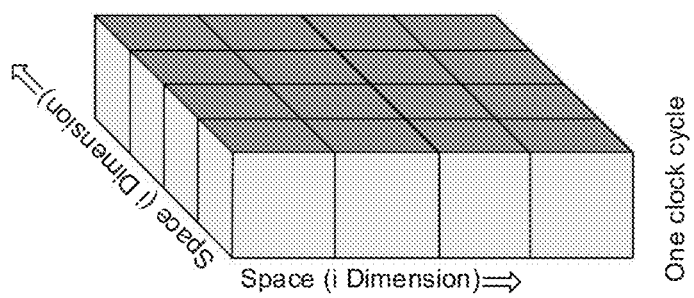

FIG. 7A represents the array in a single clock cycle. The array includes a plurality of cells in a first dimension, shown as 4 cells in an i dimension, though it should be understood that other numbers of cells may be included to provide a different value for the i dimension. The illustrated array in FIG. 7A further includes a plurality of cells in the j dimension, here illustrated as 4 cells. Similarly it should be understood that the value of j may be varied, and may be the same or different as the value of i.

FIG. 7B illustrates a 3D diagram where the two spatial dimensions of the systolic array are two dimensions and time is the third dimension. An array cycle is a diagonal plane that slices through this 3D diagram at a 45 degree angle between the time dimension and both spatial dimensions. In this array-cycle diagram, the N2=42=16 lighter shaded blocks take 2N−1=7 cycles to execute, where the lighter shaded wavefront walks to each successive spatial antidiagonal at a rate of one antidiagonal per cycle.

Figure 7D:
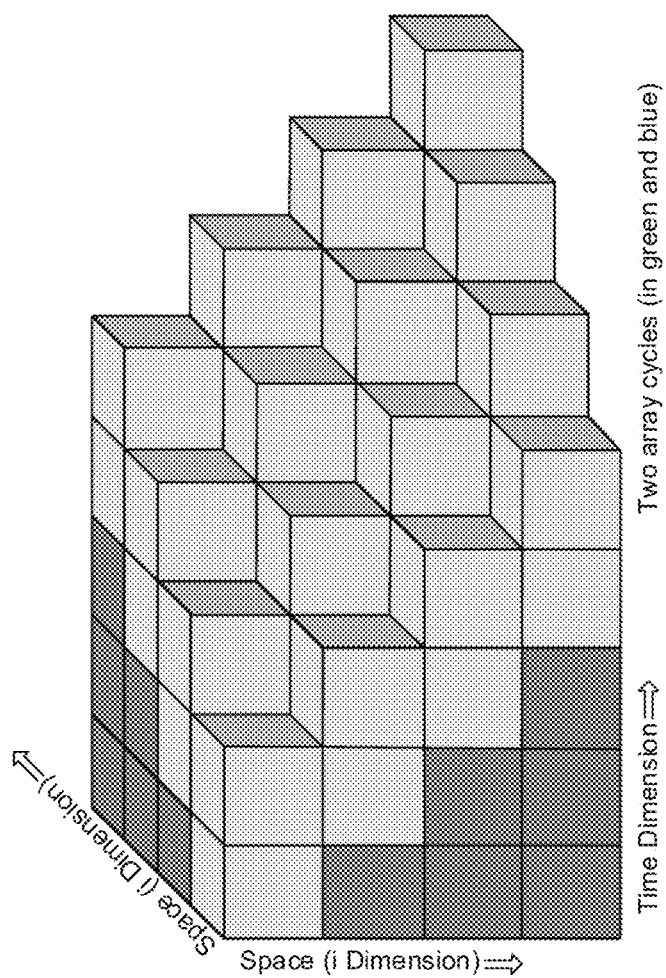
Figure 7C:
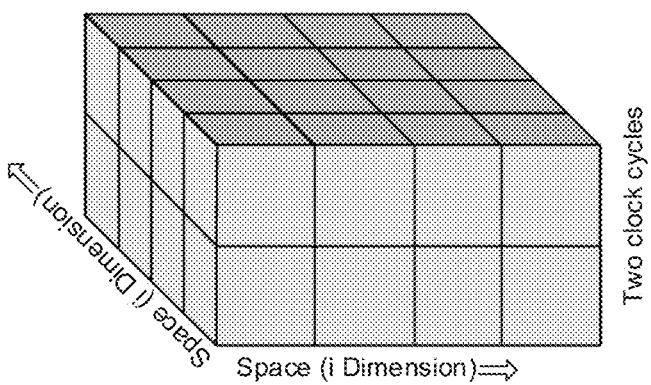

FIGS. 7C-7D illustrate an example stagger, including one multi-cycle cell program. FIG. 7C represents two clock cycles, each clock cycle having a different shade. FIG. 7D represents execution of a multiple-cycle cell program using the array 200 (FIG. 2). Although the cell program has a multiple-cycle length, the program still has an inter-cell stagger of 1. These array cycles of FIG. 7D look like pipelined replicas of FIG. 7B, where the blue array cycle is the most recent (started at t=1), while the green array cycle is older/earlier (started at t=0).

Figure 7E:
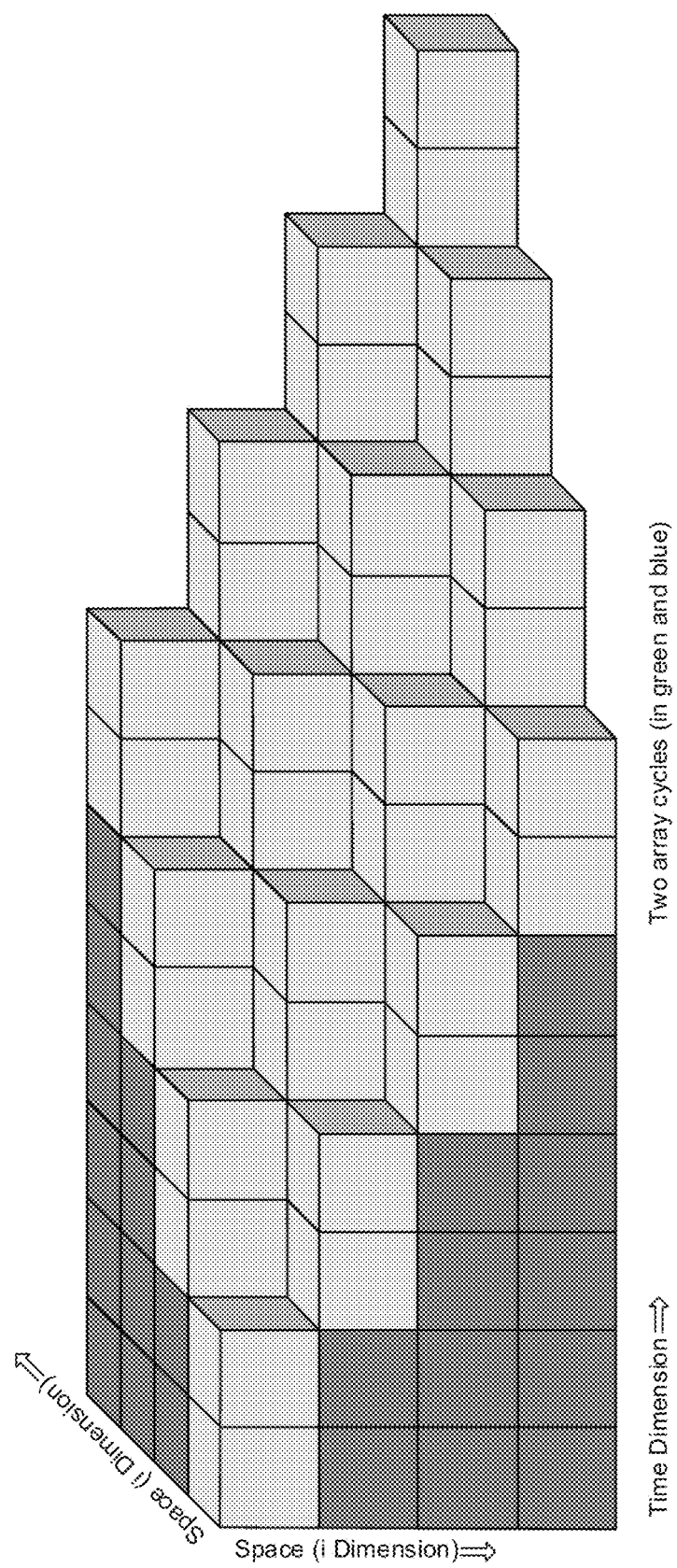

FIG. 7E illustrates an example where the stagger is greater than one. FIG. 7E shows a two-cycle program with a true dependence through a bus from the blue (second) instruction to the green (first) instruction in the next cell.

While the examples above illustrate stagger of one or two instructions, additional stagger may be supported. For example, the array may support a stagger of 8 or more instructions worth of delay between when an instruction begins execution in a cell and when it begins execution on the successor cells.

Figure 8:
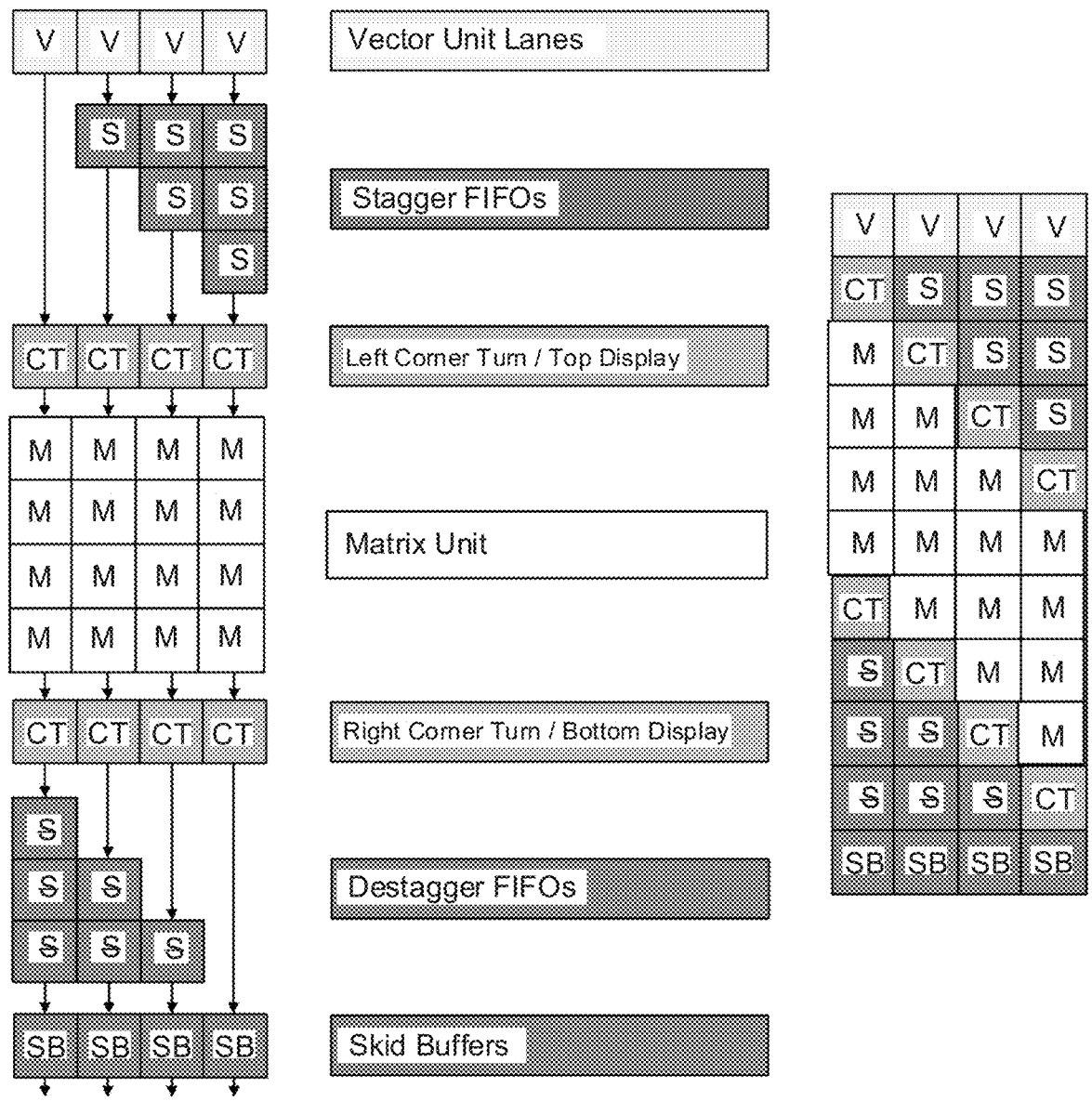
FIG. 8 is an example timing diagram illustrating a combined timing of vector unit, stagger insertion, LHS corner turn, matrix unit, RHS corner turn, destagger, skid buffers, and returning of values to the vector unit.

FIG. 8 provides an example timing diagram illustrating a combined timing of vector unit, stagger insertion, LHS corner turn, matrix unit, RHS corner turn, destagger, skid buffers, and returning of values to the vector unit. Stagger is, for example, a difference between SIMD/vector-style parallelism timing and systolic/pipelined timing. Data flows through the matrix unit and progresses in time from top to bottom. The left half of the diagram shows four vector lanes and corresponding matrix columns, with time running vertically in conceptual phases. Vector data arrives in parallel at the vector-matrix unit. Stagger FIFOs inject i cycles of latency into data that will be injected at the ith column or row of the matrix unit. The left corner turn takes 2 cycles of wire and flip-flop delay. To make sure that left and top inputs arrive at the matrix unit in synchrony, top inputs are delayed by two cycles. The matrix unit has four cycles of top-to-bottom latency. The right corner turn and matching bottom delay takes another two cycles. The destagger FIFOs add N−i−1 cycles of delay to the ith column. The skid buffers have room for 2N+2 cycles worth of work, so that all of the preceding logic can always drain into them safely. The right half of the diagram shows the cycle-by-cycle timing. According to some examples, this may be scaled such as by using 4 corner-turn cycles, a total of 31 stagger/unstagger cycles, and 32 cycles of latency. The right half of the diagram shows the effect of staggered on when operands move through the matrix unit.

The computing system described above may be capable of various operations, including matrix-vector multiplication, sparse matrix-vector multiplication, permutations, scatter step and gather step, vector manipulations such as shift, rotate, strided slice, concat, append, etc., sorting, and other operations. According to some examples, the computing system may perform a different permutation every cycle. Some example operations are described below in connection with FIGS. 8-12.

Figure 9:
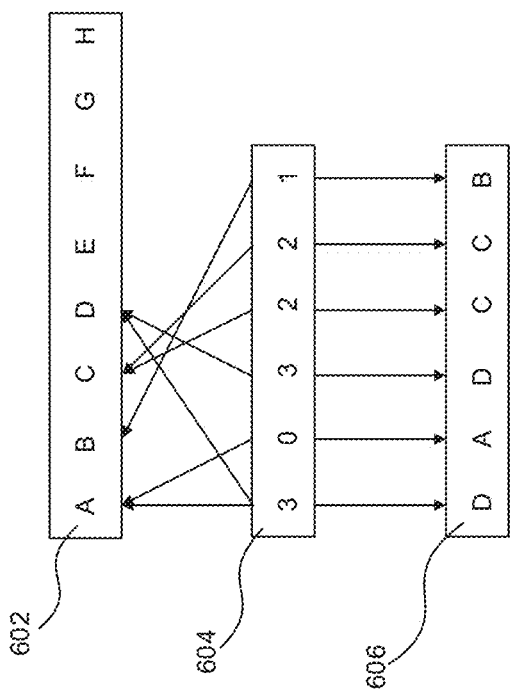
FIG. 9 illustrates an example gather operation according to aspects of the disclosure.

FIG. 9 illustrates an example gather operation. The gather operation may include parallel generalization of a load. For example, an index 604 may be used to gather data from a table 602 and provide output 606. A value in the index 604 corresponds to a position in the table 602 from which to gather the data. For example, program code for the operation may include:

```
def serial_gather(table, indices):
    out = np.zeros(indices.size)
    for i, index in enumerate(indices):
        out[i] = table[index]
    return out
```

Figure 10:
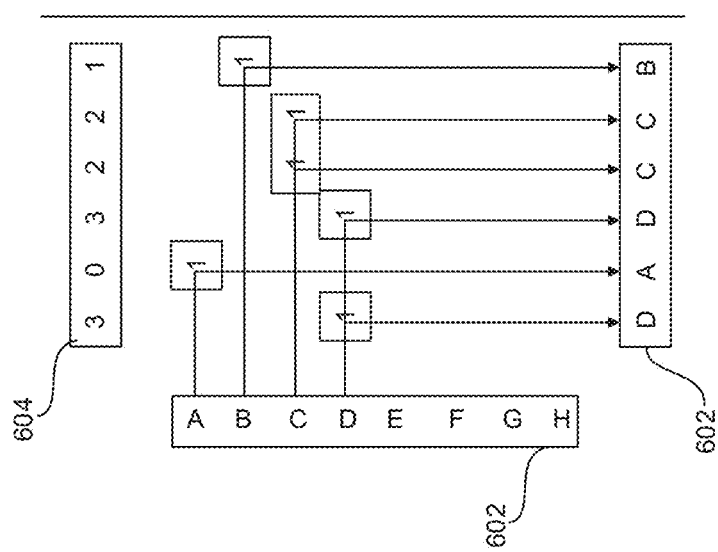
FIG. 10 illustrates another example gather operation according to aspects of the disclosure.

FIG. 10 illustrates another gather operation, include parallel generalization of another load. For example, such operation may be coded as:

```
def expand_1hot(indices, height=None):
    out = np.zeros((height, indices.size))
    out[indices, np.arange(indices.size)] = 1
    return out
def gather(table, indices):
    return table @ expand_1hot(indices,\
        len(table))
```

Figure 11B:
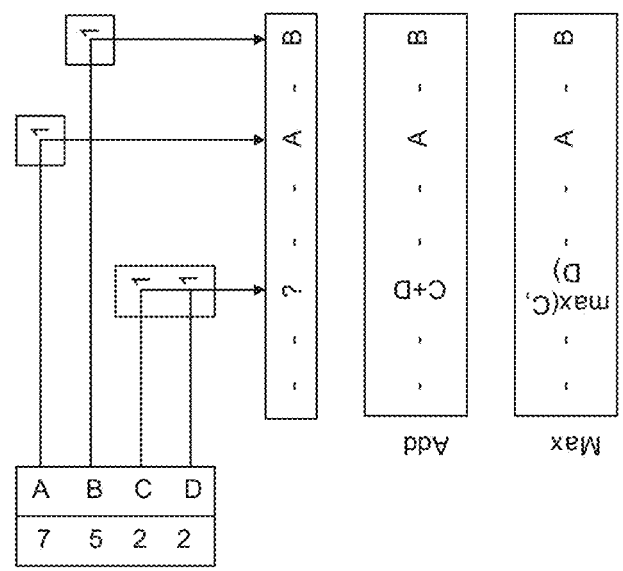
FIGS. 11A-11B illustrate example scatter operations according to aspects of the disclosure.
Figure 11A:
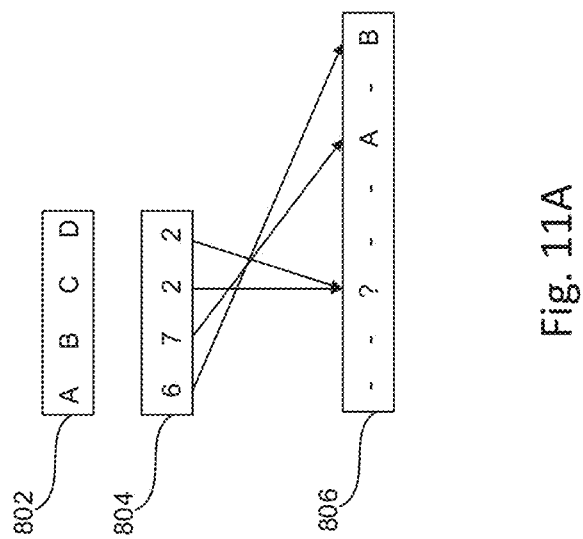

FIGS. 11A-11B illustrate example scatter operations. Referring to FIG. 11A, index 804 may be used to scatter data from table 802 into output 806. In some instances, however, an address collision may occur. For example, in FIG. 11A an address collision occurs for the output corresponding to index value "2" because there are two values of "2" in the index directed to a same address space in the output. FIG. 11B illustrates an example of using a matrix reduction operation to resolve the address collision. For example, an add operation may be used to add collisions. In other examples, a max operation may be used to determine that a maximum values among any collided values would be returned.

Figure 12B:
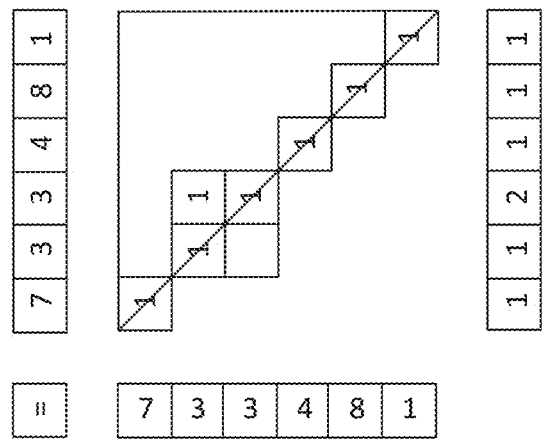
FIGS. 12A-12B illustrate example sort operations according to aspects of the disclosure.
Figure 12A:
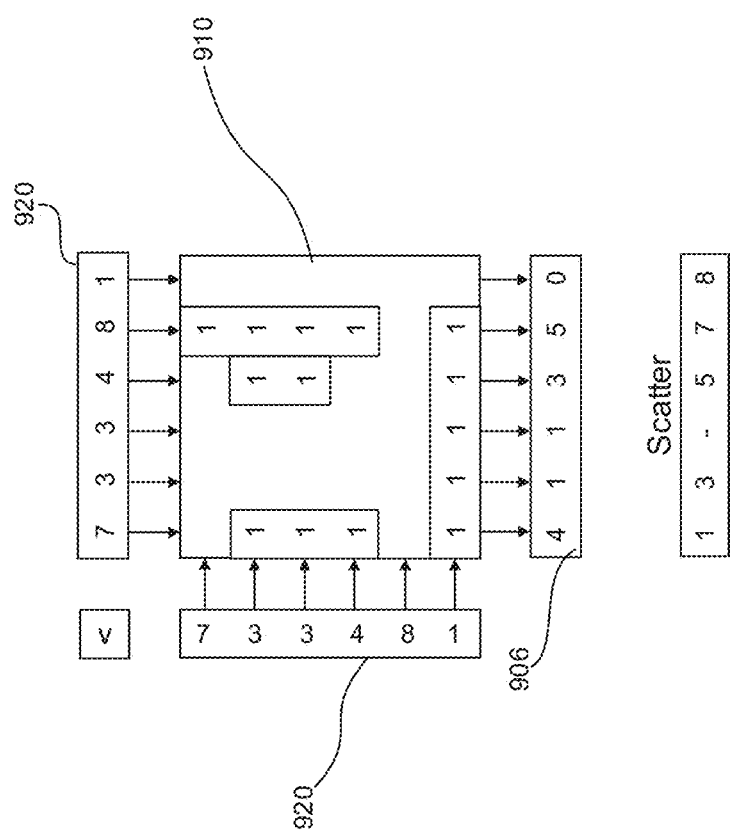
Figure 13:
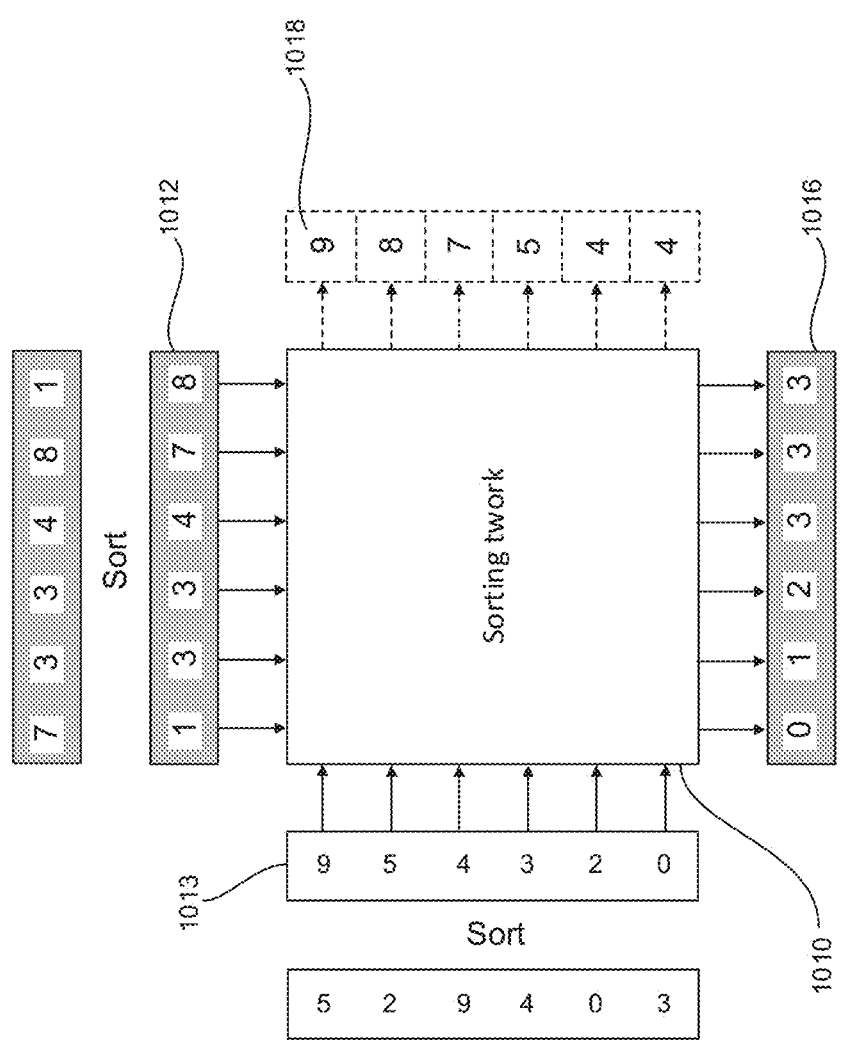
FIG. 13 depicts an example merge-sort-step operation according to aspects of the disclosure.

FIGS. 11=2A-B illustrate an example sort, such as an argsort on a vector of integers. Shown in FIG. 12A, comparisons are performed by matrix 910 between left and top vector data 920. The matrix 910 takes linear inputs, does quadratic work, and provides linear output, pipelining once per cycle. The output 906 can be fed to scatter to sort the data. As shown in FIG. 12B, collisions may be broken to assign unique locations to duplicated data items. This nudges the duplicates so they each get a unique scatter index.

FIG. 12=3 illustrates an example merge-sort-step operation. A first sorted vector 1012 is pushed at a top of matrix unit 1010. A second reverse-sorted vector 1013 is pushed at a left of the matrix unit 1010. The bottom result is a sorted vector 1016. Building right edge outputs may produce reverse-sorted vector 1018. In some examples, a second cycle can be run with reversed polarity. Rather than using a second cycle with a modified program to get the right hand side (RHS) outputs, the system may include wiring to optionally return the RHS outputs. For example, such wiring can return one of the bottom or right-side array fringe outputs in a cycle, though both may be available. Both output can be obtained through multiple cycles.

While a number of example operations are illustrated above, it should be understood that these are merely a few example operations and that numerous operations are possible using the computing system described above in connection with FIGS. 1-5. For example, the computing system may be capable of mapping a large class of doubly nested loops and accelerating them in hardware. Because of the memory limitations, the bodies of these doubly nested loops can only depend on the previous loop iteration in each dimension, and they can only store what fits in the local register file. But the prior loop iteration in each spatial dimension, and the temporal storage in the register file allow very tall dependence chains to be mapped onto the computing system.

The computing unit described herein is beneficial in that it is entirely statically schedulable and predictable. There is no contention, arbitration, or queueing in the architecture, which means there is no tail latency. Moreover, there is no dynamic variation in the timing of the array. The speed with which data propagates through the array can be determined entirely statically, by compiler analysis ahead of program execution.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A processor cell, comprising:
   a crossbar switch;
   a first floating point logic unit (FPLU) configured to:
      receive, as input to the first FPLU, output from the crossbar switch; and provide, as output from the first FPLU, input to one or more additional processing cells;
a second FPLU configured to:
receive, as input to the second FPLU, output from the crossbar switch; and
provide, as output from the second FPLU, input to the one or more additional processing cells; and
a register file configured to:
receive, as input to the register file, the outputs from the first FPLU and the second FPLU; and
provide, as output from the register file, one or more inputs to the crossbar switch.

2. The processor cell of claim 1, wherein at least one of the first or second FPLUs comprises an 8-bit, 16-bit, 32-bit, or 64-bit FPLU.

3. The processor cell of claim 1, wherein the crossbar switch is configured to receive, as input to the crossbar switch, output from the one or more additional processing cells.

4. The processor cell of claim 1, wherein at least one of the first or second FPLUs comprises a multiplier.

5. The processor cell of claim 1, further comprising a multiplexer configured to:
receive, as input to the multiplexer, the outputs from the first FPLU and the second FPLU; and
provide, as output from the multiplexer, an input to the register file.

6. The processor cell of claim 1, wherein the first FPLU is coupled to a first output of the crossbar switch and the second FPLU is coupled to a second output of the crossbar switch.

7. A computation unit, comprising:
a plurality of processor cells having a first output of a first processor cell provided as input to a second processor cell and a second output of the first processor cell provided as input to a third processor cell, wherein each processor cell comprises:
a crossbar switch;
a plurality of floating point logic units (FPLUs), each FPLU configured to:
receive, as input to the FPLU, output from the crossbar switch; and
provide, as output from the FPLU, input to the second or third processor cell; and
a register file configured to:
receive, as input to the register file, the outputs from the plurality of FPLUs; and
provide, as output from the register file, one or more inputs to the crossbar switch.

8. The computation unit of claim 7, wherein at least one of the plurality of FPLUS comprises an 8-bit, 16-bit, 32-bit, or 64-bit FPLU.

9. The computation unit of claim 7, wherein at least one of the plurality of processor cells further comprises a multiplexer configured to:
receive, as input to the multiplexer, the outputs from the plurality of FPLUs; and
provide, as output from the multiplexer, an input to the register file.

10. The computation unit of claim 7, wherein at least one of the plurality of FPLUs comprises a multiplier.

11. The computation unit of claim 7, wherein the plurality of FPLUs comprises a first FPLU coupled to a first output of the crossbar switch and a second FPLU coupled to a second output of the crossbar switch.

12. The computation unit of claim 7, wherein a crossbar switch of the first processor cell is configured to receive, as input to the crossbar switch, output from a fourth processor cell.

13. The computation unit of claim 7, wherein the computation unit is configured to receive two source vectors and produce at least one result vector per cycle.

14. A computing system, comprising:
one or more memories;
one or more processors in communication with the one or more memories;
a plurality of cells in communication with the one or more processors, the plurality of cells having a first output of a first cell provided as input to a second cell and a second output of the first cell provided as input to a third cell, wherein each cell comprises:
a crossbar switch;
a plurality of floating point logic units (FPLUs), each FPLU configured to:
receive, as input to the FPLU, output from the crossbar switch; and
provide, as output from the FPLU, input to the second or third cell;
and a register file configured to:
receive, as input to the register file, the outputs from the plurality of FPLUs; and
provide, as output from the register file, one or more inputs to the crossbar switch.

15. The computing system of claim 14, wherein the one or more processors comprise at least one of a scalar core or a vector processing unit.

16. The computing system of claim 14, wherein the one or more memories comprise a vector data cache or a level one cache.

17. The computing system of claim 14, further comprising a sequencer configured to control instructions sent to the one or more processors and the plurality of cells.

18. The computing system of claim 14, wherein the plurality of cells is configured to receive two source vectors and produce at least one result vector per cycle.

19. The computing system of claim 14, wherein at least one of the plurality of cells further comprises a multiplexer configured to:
receive, as input to the multiplexer, the outputs from the plurality of FPLUs; and
provide, as output from the multiplexer, an input to the register file.

20. The computing system of claim 14, wherein a crossbar switch of the first cell is configured to receive, as input to the crossbar switch, output from a fourth cell.

* * * * *